United States Patent
Chui (10) Patent No.: US 6,707,799 B1
(45) Date of Patent: *Mar. 16, 2004

(54) DYNAMIC CONTROL PROTOCOL FOR FRAME RELAY FRAGMENTATION IN SUPPORT OF REAL-TIME APPLICATIONS SUCH AS VOIP AND VOFR

(75) Inventor: Timothy L. Chui, Fremont, CA (US)

(73) Assignee: 3Com Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/321,314

(22) Filed: May 27, 1999

(51) Int. Cl.$^7$ ................................................ H04B 1/44
(52) U.S. Cl. ........................ 370/282; 370/352; 370/468
(58) Field of Search .................. 370/352–356, 370/465, 400, 466, 467, 428, 429, 535, 351, 22.9, 401, 397, 386, 389, 230, 392, 419, 282, 468, 252; 379/229, 42; 709/227

(56) References Cited

U.S. PATENT DOCUMENTS 6,208,650 B1 * 3/2001 Hassell et al. ............. 370/392
6,278,708 B1 * 8/2001 Von Hammerstein et al. ........................ 370/389
6,292,495 B1 * 9/2001 Von Hammerstein et al. ........................ 370/465
6,412,006 B2 * 6/2002 Naudus ..................... 709/227

OTHER PUBLICATIONS

Frame Relay Forum Technical Committee, FRF.11, "Voice over Frame Relay Implementation Agreement", Dec. 1998.*
Frame Relay Forum Technical Committee, FRF.12, "Frame Relay Fragmentation Implementation Agreement", Dec. 1997.*
RFC 1490, "Multiprotocol Interconnect over Frame Relay", Jul. 1993.*

* cited by examiner

Primary Examiner—John Pezzlo (57) ABSTRACT

Frame Relay (FR) fragmentation control protocol for enabling FR access device and switches to support real-time traffic, such as VoIP and VOFR, enables communicating peers to negotiate dynamically for fragmentation operation and configuration parameters, as well as to terminate such an operation. Procedure is applicable to FR UNI or NNI fragmentation and end-to-end fragmentation, as well as to PPP fragmentation. Effectively, fragmentation is deployable on demand, and configuration negotiation is supportable across the network. Preferably, such control protocol allows systems with fragmentation to interoperate with older systems that do not support fragmentation.

18 Claims, 8 Drawing Sheets

| FCP states | Explanations |
|---|---|
| Fragmentation Reset | Fragmentation operation is disabled. |
| Fragmentation Ready | Fragmentation is not in operation but can be activated at any time |
| Fragmentation ON initiated | Fragmentation_on_ request has been sent to the peer and is awaiting the peer to enter into fragmentation operation. |
| Fragmentation Active | Both peers have agreed to entering into fragmentation operation. Fragmented frames will be exchanged during this state. |
| Fragmentation OFF Initiated | Fragmentation_off_request has been sent to the remote requesting that fragmentation be terminated |

| bit | 8 | 7 | 6 | 5 | 4 | 3 | 2 | 1 |
|---|---|---|---|---|---|---|---|---|
| Frame Relay | DLCI High six bits | | | | | | c/r | 0 |
| header | DLCI low four bits | | | | F | B | DE | 1 |
| UI (0x03) | 0 | 0 | 0 | 0 | 0 | 0 | 1 | 1 |
| NLPID(0xB1) | 1 | 0 | 1 | 1 | 0 | 0 | 0 | 1 |
| Fragmentation Header | B=0 | E=0 | c/d =1 | Seq # high 4 bits | | | | 0 |
| | Sequence # low eight bits | | | | | | | |
| FCP Msg | 0 | 0 | 0 | 0 | 0 | 0 | x | x |
| MaxFrame Size | Frame size (Low 8 bits) | | | | | | | |
| | Frame size (high 8 bits) | | | | | | | |
| | FCS (2 octets) | | | | | | | |

FIG. 4A

| Message Types | Values | Explanation |
| --- | --- | --- |
| Fragmentation Reset | 0 | to inform the peer that the user of the fragmentation has gone through a reset. The peer should reset its receive fragmentation procedure. |
| Fragmentation ON Request | 1 | to request that fragmentation be turned on |
| Fragmentation ON Confirm | 2 | to confirm that fragmentation request is granted |
| Fragmentation OFF Request | 3 | to request that fragmentation be terminated |
| Fragmentation OFF Confirm | 4 | to confirm that fragmentation can be terminated |

FIG. 4B

| FCP states | Explanations |
|---|---|
| Fragmentation Reset | Fragmentation operation is disabled. |
| Fragmentation Ready | Fragmentation is not in operation but can be activated at any time |
| Fragmentation ON Initiated | Fragmentation_on_ request has been sent to the peer and is awaiting the peer to enter into fragmentation operation. |
| Fragmentation Active | Both peers have agreed to entering into fragmentation operation. Fragmented frames will be exchanged during this state. |
| Fragmentation OFF Initiated | Fragmentation_off_request has been sent to the remote requesting that fragmentation be terminated |

FIG. 5A

| bit | 8 | 7 | 6 | 5 | 4 | 3 | 2 | 1 |
|---|---|---|---|---|---|---|---|---|
| Fragmentation Header | B=0 | E=0 | c/d =1 | Seq # high 4 bits | | | | 0 |
| | Sequence # low 8 bits | | | | | | | |
| FCP Msg | 0 | 0 | 0 | 0 | 0 | 0 | x | x |
| MaxFrame Size | Frame size (Low 8 bits) | | | | | | | |
| | Frame size (high 8 bits) | | | | | | | |
| | FCS (2 octets) | | | | | | | |

FIG. 5B

DYNAMIC CONTROL PROTOCOL FOR FRAME RELAY FRAGMENTATION IN SUPPORT OF REAL-TIME APPLICATIONS SUCH AS VOIP AND VOFR

FIELD OF INVENTION

Invention relates to electronic networks, particularly network protocol for frame relay fragmentation for supporting real-time digital voice traffic.

BACKGROUND OF INVENTION

Various networking equipment and interfaces, such as frame relay-based access devices and switches, increasingly are used for communicating digital voice messages, as well as conventional data. Typically, fragmentation of communicated messages for network transmission is supported for many data applications.

However, without a suitable control protocol, the fragmentation operation may encounter certain problems. For example, fragmentation must be configured statistically for all virtual circuits (VCs) to all destinations, and all fragmentation must be activated at all times. This would be an inefficient use of system resources and wide-area network (WAN) access bandwidth, particularly when there is no voice call.

Additionally, another problem may arise when both peers of the virtual circuit must configure correctly the fragment packet size to reflect the speeds of the physical interface and requirement for voice coder/decoder (codec), but there is no safeguard necessarily when the fragment packet size configured is acceptable for operation. Hence, when the fragment packet size is incorrect, then undesirable latency may result.

Furthermore, another problem may arise due to the nature of the fragmentation being all VCs that share the same interface perform fragmentation concurrently, such that many (e.g., tens or hundreds) of VCs demand fragmentation with all their peers across the network. Thus, without a control protocol, it is difficult to determine fragmentation capability at the remote end. If one side of the virtual circuit is configured for fragmentation, and the other end is not, then the whole virtual circuit may fail.

Moreover, generally, as higher-speed or real-time traffic, particularly voice or video based information, is transmitted over the network, there is a need for improved protocol for supporting such real-time applications, particularly for controlling frame-relay fragmentation.

SUMMARY OF INVENTION

Invention resides in a Frame Relay (FR) fragmentation control protocol (FCP) and/or system for enabling FR access device and switches to support real-time traffic, such as Voice over Internet Protocol (VOIP) and Voice over Frame Relay (VOFR). Preferred FR control protocol enables communicating peers to negotiate dynamically for fragmentation operation and configuration parameters, as well as operation termination. Such protocol applies to FR User to Network Interface (UNI) fragmentation and end-to-end fragmentation.

Generally, in a digital network including various routers coupled for frame relay networking, a novel fragmentation control protocol is implemented such that initially multiple peer units are determined in at least one virtual circuit for frame relay-based signaling through one or more interfaces, then fragmentation is selectively provided to the virtual circuit(s).

Fragmentation is deployable on demand, and configuration negotiation is supportable across the network. Preferably, such control protocol allows systems with fragmentation to interoperate with older systems that do not support fragmentation.

BRIEF DESCRIPTION OF PREFERRED EMBODIMENT(S)

Preferred embodiment is implemented in apparatus and/or related process for Frame Relay (FR) fragmentation control protocol (FCP), particularly to enable FR access devices (FRAD), switches, or other FR networking component to support real-time traffic, such as Voice over Internet Protocol (VOIP) and Voice over Frame Relay (VOFR). As referred to herein, such real-time or other time-sensitive traffic are generally referred to as term "voice calls."

FR FCP enables communicating peers to negotiate dynamically for fragmentation operation and configuration parameters, termination operation, and applies to FR User to Network Interface (UNI) fragmentation as well as end-to-end fragmentation. FCP function defined herein may be implemented by general purpose processor or application-specific electronics, programmably using executable program code or other software instructions and/or digital logic circuits. As understood herein, term "end-to-end fragmentation" refers generally to fragmentation between two virtual circuit (VC) peers, in a manner that is effectively transparent to the FR network.

Generally, one or more digital networks are provided including multiple routing or switching units coupled for high-speed electronic networking according to frame relay, packet, cell, or other data communication scheme. In particular, a novel fragmentation control protocol is described herein, such that multiple peer units in an FR virtual circuit (VC), for example, are dynamically provided with fragmentation service, preferably on demand over wide-area network interfaces. Additionally, FCP supports configuration negotiation across the network, and allows interoperability with non-fragmentation systems.

Figure 1A:
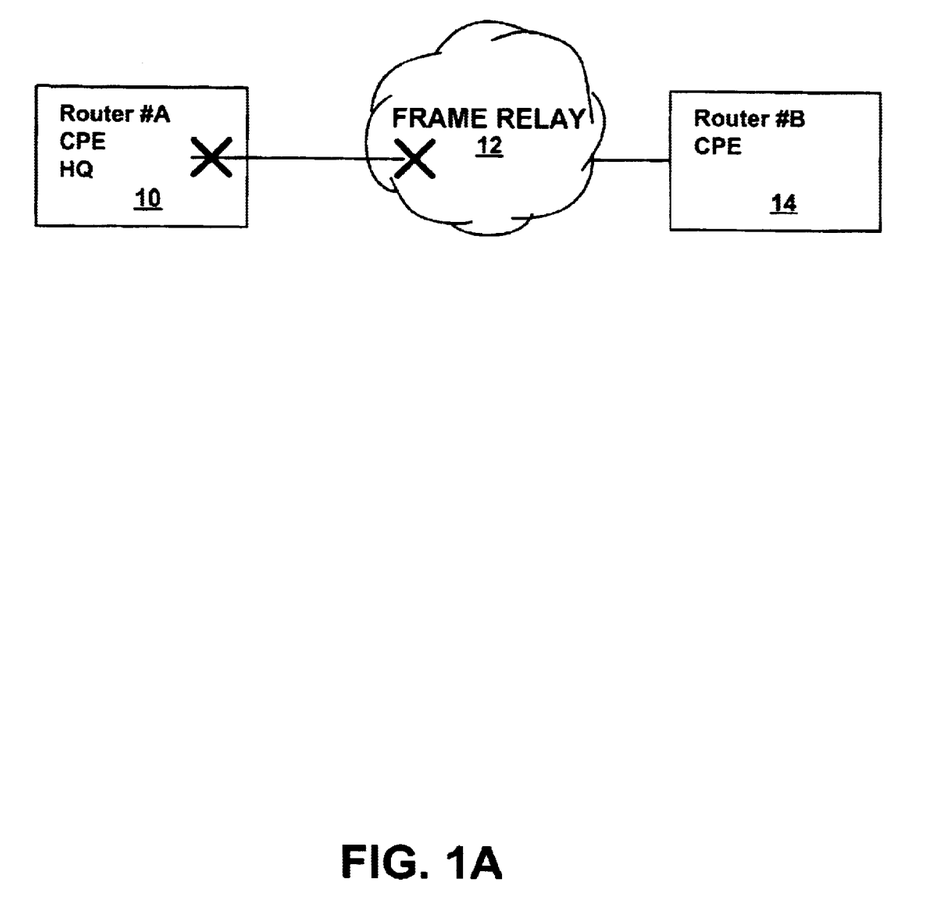
FIG. 1A is a general frame relay network block diagram for implementing an embodiment of the present invention in a User to Network Interface (UNI)/Network to Network Interface (NNI) fragmentation configuration.

Referring to FIG. 1A, a general frame relay network block diagram is shown of User to Network Interface (UNI)/

Figure 1B:
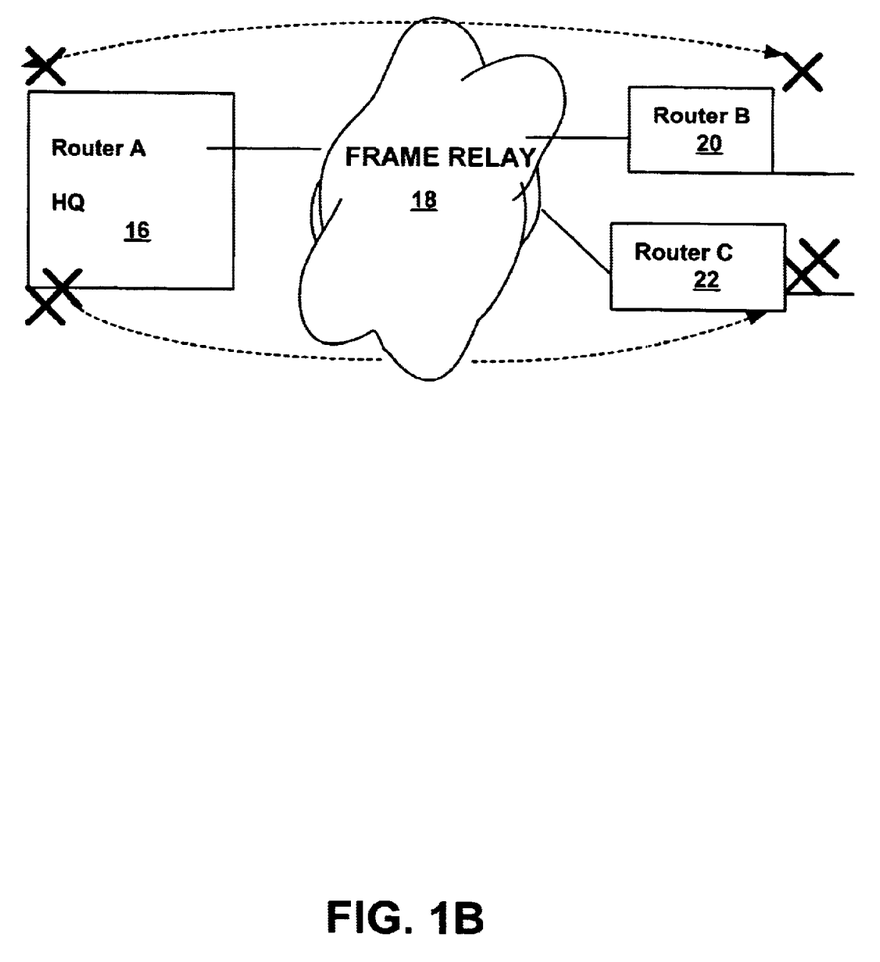
FIG. 1B is a general frame relay network block diagram for implementing an embodiment of the present invention in an end-to-end fragmentation configuration.

Network to Network Interface (NNI) fragmentation configuration; and FIG. 1B, where a general frame relay network block diagram is shown of end-to-end fragmentation configuration. Both configurations are applicable to the present invention as discussed herein.

In FIG. 1A, UNI fragmentation configuration is provided, such that router A 10 at customer premises equipment (CPE) at headquarters (HQ) couples to frame relay network 12, which couples further to router B 14 also at CPE. Here, FRAD CPE and FR network switch interfaces act as fragmentation and reassembly peers. Fragmentation applies to frames traveling over UNI interface. FCP allows CPE router or FRAD as well as switch at either end of physical interface to turn on or off fragmentation operation to negotiate for fragment packet size.

In FIG. 1B, end-to-end (i.e., CPE-to-remote CPE) fragmentation is provided, such that HQ router A 16 couples to FR network 18, which couple to routers B 20, C 22. Here, communicating VC peers act as fragmentation and reassembly peers on a per VC basis, independent of other VCs; such communication operation occurs between two end-points (i.e., the X's shown), transparently from FR network 18.

In order to facilitate transmission of real-time voice frames, end-to-end fragmentation is activated on data VCs sharing the same interface. For end-to-end FCP, a protocol is negotiated with each remote peer for fragmentation operation. Fragmentation may be turned on or off, depending on voice application requirement; because a number of conventional network systems may not support fragmentation. CFP control software described herein can detect absence of fragmentation support capability.

Preferably, FCP control software and/or hardware functionality provides following control processes:
1. FCP procedure allows peer entity to activate and/or terminate fragmentation operation. External API may be provided for voice applications to trigger dynamic fragmentation indirectly.
2. For UNI fragmentation, FCP procedure is performed between CPE and switch. For NNI fragmentation, FCP procedure is operated between two switches. Note that fragmentation frame size is negotiated for each interface, and the smaller of the two fragments is used for fragmentation.
3. For end-to-end fragmentation, FCP procedure is independently performed on each individual VC. Hence, if a single voice call is detected at the interface, then fragmentation is initiated for all VCs sharing the same interface. Only those peers that are capable of supporting fragmentation result in end-to-end fragmentation. Fragmentation frame size is negotiated for each VC; the smaller of the two fragments is used for fragmentation.

Moreover, if a voice call ceases, then fragmentation operation is discontinued when the peer agrees to relinquish the operation. Further, if the remote peer supports specified format of fragmentation (e.g., Frame Relay Fragmentation (FRF)), then fragmentation may be turned on automatically upon detection of certain format data frames, without necessarily exchanging FCP-format message. Optionally, other point-to-point fragmentation protocol (e.g., so-called "PPP" fragmentation) may be supported by FCP procedure.

Figure 2:
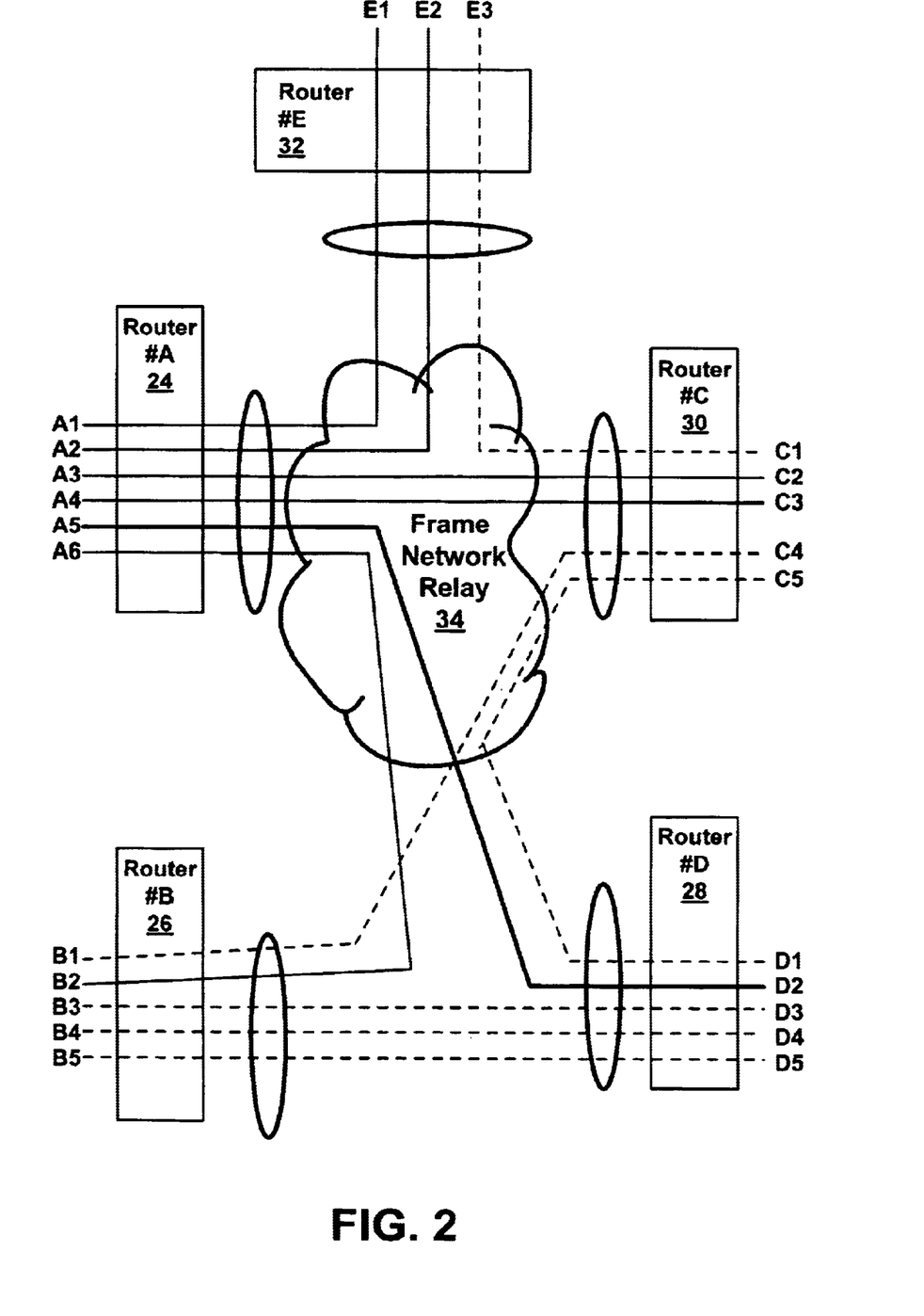
FIG. 2 is a general block diagram of a frame relay network virtual circuit for implementing an embodiment of the present invention.

FIG. 2 is a general block diagram of FR network virtual circuit architecture for 10 enabling real-time support of VoIP and VoFR applications. As shown, FR network 34 couples routers A 24, B 26, D 28, C 30, and E 32. FR network is configurable such that VC group shares common physical interface. Thus, when real-time voice call shares virtual circuit connection over same physical interface with other voice or non-voice VCs, every sharing VC behaves as a good corporate citizen, according to a preferred interface, protocol, or fragmentation methodology described herein, in order that the voice payload is transported in timely manner over the access interface.

Here, for example, when router A 24 makes voice call to router D 28, voice call is established across VC between A5 and D2 virtual circuit lines, and other VCs on router A 24, (i.e., A1, A2, A3, A4, and A6) and respective remote peers activate fragmentation operation, according to present invention. And when router D 28 engages voice call over D2, other VCs sharing same physical interface (i.e., D1, D2, D4, and D5) perform the fragmentation scheme with respective peers.

Furthermore, voice call across router A 24 and router D 28 may cause VC fragmentation operation at other routers B 26 and E 32. Additionally, for instance, when voice call occurs between lines A5 and D2, and router D 28 establishes voice call between lines D1 and C5, all VCs at router D 28 continue fragmentation for all its VCs, even when the voice call between A5 and D2 is terminated. Meanwhile, router A 24 continues supporting fragmentation at A5.

Although end-to-end FCP is operated on per-VC basis, fragmentation use at each VC may affect FR network physical interface, such that fragmentation requirement propagates across FR network to various remote peers. Further, when multiple voice calls are activated and/or terminated dynamically across the FR network, fragmentation requirement at each VC may change dynamically. Accordingly, per the present methodology and system (i.e., FCP), fragmentation operation is controlled in orderly fashion.

Preferably, FCP uses FR Permanent Virtual Circuit (PVC) or FR Switched Virtual Circuit (SVC) to enable protocol exchange. SVC virtual circuit, unlike PVC, is not always connected; and when SVC is inactive, FCP cannot perform FCP protocol exchange to activate or terminate fragmentation. Fragmentation requirement is determined subsequently, depending on new requirement of voice activities in the FR network.

Requirements for SVC connections and fragmentation are dynamically determined by FCP, e.g., fragmentation requirement being detected while SVC is disconnected. Further, when SVC is re-established, SVC detects real-time requirement for fragmentation, such that one or more peers are signaled or otherwise indicated to enter fragmentation operation. Fragmentation requirement indication may originate from voice call over the VC or neighboring VCs, and remote peer may request fragmentation.

Generally, dynamic FCP scheme described herein is useful in digital network supporting voice traffic, although general non-voice operation is supportable as well. Dynamic FCP may negotiate end-to-end fragment size, and operates on per-VC basis, i.e., one to each VC destination.

Note that in other (e.g., older non-3Com) network systems where VC peers may not support FCP, fragmentation scheme described herein still may cooperate therewith; and VC peers with fragmentation and VC peers without fragmentation may co-exist over the same interface.

Preferably, fragmentation configuration is changeable dynamically on demand, and VC can change from fragmentation to non-fragmentation mode, and vice versa.

Additionally, FCP peers jointly may control establishment and termination of fragmentation operation. FCP supports end-to-end and UNI/NNI configuration fragmentation. Endto-end FCP session may be dynamically activated and maintained in SVC environment in addition to control from Application Programming Interface (API).

SVC connections are dynamic based on traffic activity; and FCP session is synchronized when SVC is reconnected. Fragment size is manually configured or automatically assigned by system manager running FCP function, e.g., indirectly derived from Committed Information Rate (CIR) of the virtual circuit; such value is useful for FCP fragment size negotiation between peers. Configuration and on-line fragmentation status may be reported with negotiated fragment size.

Figure 3:
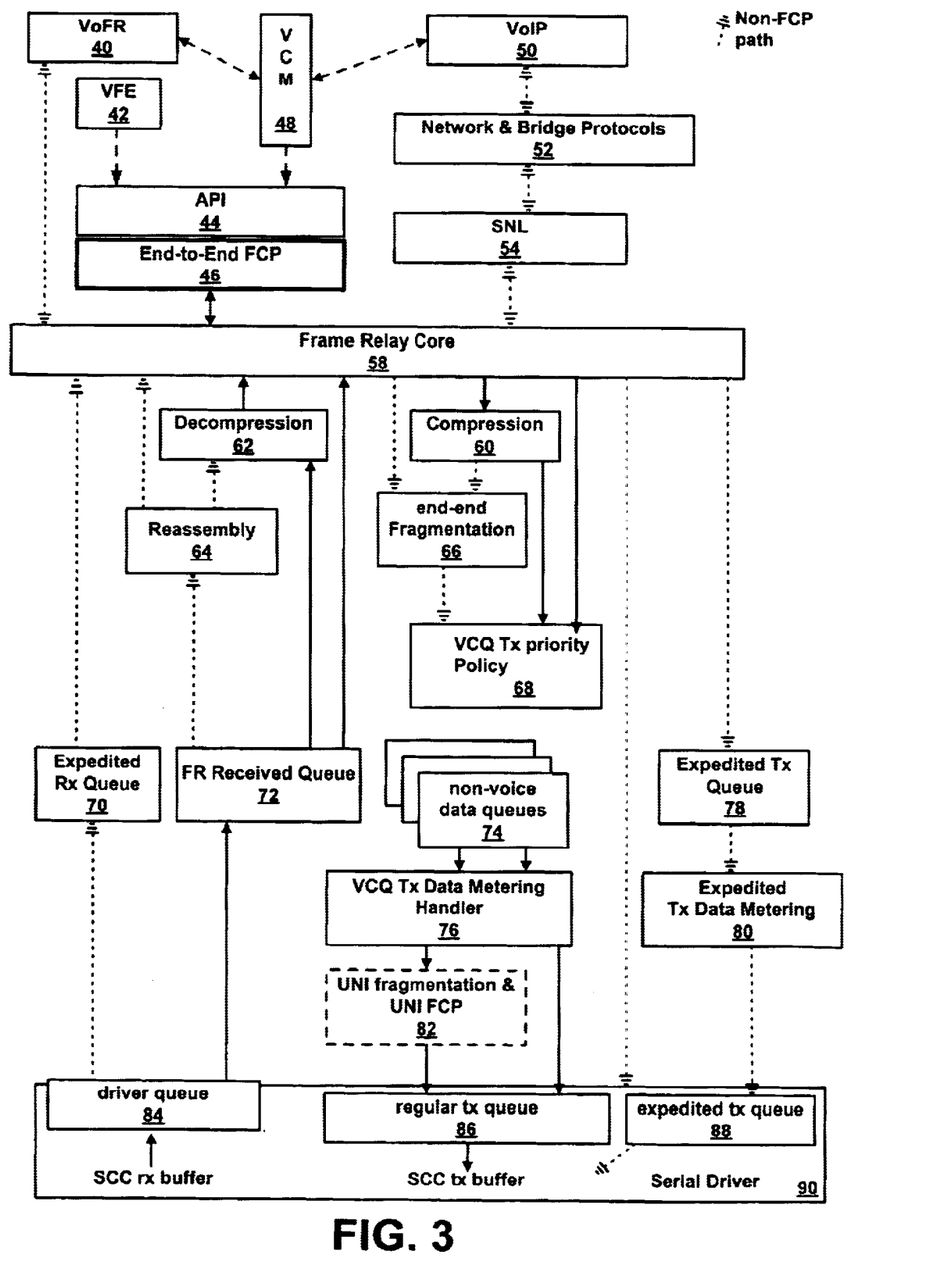
FIG. 3 is a general architectural diagram of a frame relay fragmentation system for implementing an embodiment of the present invention.

FIG. 3 is a general architectural diagram of FR fragmentation system, showing various functional blocks coupled to frame relay core 58, including FCP and Non-FCP paths. Sub Network Layer (SNL) 54 supports network protocol data, such that when VoIP is supported through specified network and bridge protocols 52, then Internet Protocol (IP) voice traffic travels through SNL 54, similarly as other IP traffic. FCP module or code operates autonomously from SNL 54.

FR core software and/or hardware 58 performs various FR PVC/SVC signaling control and data traffic. FR core 58 treats FCP packets as data traffic relevant to specifically-designated VC. Additionally, compression module 60 and decompression module 62 are placed closely to FR core 58 for data/signal compression. Preferably, modules 60, 62 function independently of FCP.

End-to-end fragmentation module 66 breaks-up transmit packets according to configured or FCP-negotiated fragment size, and performs fragmentation per end-to-end fragmentation procedure. Preferably, FCP packets are un-fragmented, and do not pass through fragmentation module 66.

Fragment reassembly module 66 gathers fragments of packet per reassembly procedure. Preferably, FCP packets are un-fragmented. End-to-end FCP module 46 dynamically establishes and/or terminates fragmentation operation according to preferred FCP methodology described herein. FCP module 46 is stand-alone module that provides API for applications using fragmentation.

In case of VoIP or VoFR, Voice Call Manager (VCM) 48 or other module (e.g., Voice Forwarding Engine (VFE) 42) that detects voice traffic uses API to inform FCP of voice traffic status. When fragmentation is indicated, one or multiple FCP sessions are established by FCP module 46, one across each VC connection. For end-to-end fragmentation, FCP control message is sent through normal data transfer path.

UNI/NNI fragmentation module 82 performs fragmentation, (preferably together with FR-Switch FCP peer) to serve as fragmentation manager at ends of physical interface across UNI or NNI interface.

API 44 is provided for applications to inform FCP 46 of voice call status indirectly leading to activation and/or termination of fragmentation. Candidates for using FCP API 44 include VCM 48, which knows of voice call states if voice devices are supported locally. In addition, for transient routers, VFE 42 knows of voice traffic.

VCM 48 monitors VoFR 40 and/or VoIP 50 calls, and informs FCP module 46 of voice call status, and FCP decides if fragmentation is turned-on all or limited VCs based on specified criteria. VFE 42 forwards voice traffic over selected quick path or expedited transmit queue. Hence, when voice traffic travels through transient router, there is no distinct voice call tracking. VFE 42 detects presence of voice traffic at specific port(s), and informs FCP module 46 of need to engage in fragmentation operation.

Transmit Data Priority Policy or Virtual Circuit Queue (VCQ) 68 is provided on a per-VC basis to mark data packets from non-voice data queues 74 according to policies configuration, and places packets into different types of queues. End-to-end FCP packets travel through transmit queue 68 like other data packets. Preferably, data traffic is separated into different queues for transmission. For example, packets in higher-priority or expedited transmit queue 78 are transmitted prior to lower-priority packets.

If VCQ transmit priority policy 68 is not configured, then packets are placed in single First In First Out (FIFO) queue as default condition. Preferably, expedited transmit queue 78 carries real-time critical voice traffic, and FCP packets do not travel through quick or expedited path or queue 78. Expedited Transmit Data Metering 80 meters to regulate expedited packets for expedited transmit queue 88 in serial driver 90.

UNI/NNI fragmentation module 82 breaks-up transmit packets from VCQ 68, preferably per specified procedure (e.g., UNI fragmentation format). Packets from regular data queue 86 are fragmented and sequenced in single stream for transmit buffer in serial driver 90. UNI FCP transmit function is provided in module 82. VCQ Transmit Data Metering Handler 76 regulates transmit traffic based on policies configured.

FR Received Queue 72 processes from driver receive queue 84 from receive buffer in serial driver 90 various FR packet types, including end-to-end, UNI, end-to-end FCP, and UNI FCP format frames. For end-to-end or UNI FCP packets, it will be forwarded to FCP for protocol processing.

In serial driver 90, receive buffer is single received queue coupled to driver receive queue 84 and FR receive queue 72 and expedited receive queue 70. Moreover, regular and expedited transmit queues 86, 88 are provided, according to transmit routines as registered by FCP, for example, when fragmentation is configured on interface.

In general, fragmentation is established and terminated dynamically upon detecting certain criteria, for example, according to time-critical voice or video communication applications. Thus, fragmentation supports time-critical applications over relatively slow WAN links. To support dynamic fragmentation, such time-critical application communicate the need for fragmentation to the fragmentation module scheme described herein.

For example, upon detecting condition of voice call establishment over slow link, FR fragmentation module is informed dynamically of real-time requirements. Note that in the absence of a suitable control procedure, it will be difficult, if not impossible, to dynamically signal endpoints regarding fragmentation requirements, because in a large network, many VCs are sharing the same interface, and each VC connects to different remote sites.

Fragmentation function serves to prevent long frame occupying transmission path for longer than maximum latency permitted, particularly as real-time critical frames, such as voice payload destined for remote site, need to be transmitted in timely fashion through network physical interface. When requirement for real-time frame transmission exists at such interface, fragmentation may be dynamically activated according to present methodology for frames transmitted across the interface.

Fragmentation is thus activated on per-VC basis across VCs at the network physical interface, preferably providing that fragmentation is successfully configured or negotiated. When fragmentation is determined by FCP module as no longer needed, VC fragmentation may be removed if VC peers in virtual circuit or specified network community agree to such request (i.e., each VC works as a good citizen in the VC community, locally as well as globally.) End-to-end fragmentation is controlled dynamically on per-VC basis, and because. VCs may terminate at various location, voice activity at certain location may cause the need for fragmentation at other locations in the network. Fragmentation requirements constantly change at various locations, which impact other non-voice carrying VC connections throughout the network.

VC status is classifiable dynamically as follows by FCP module, depending on voice activity at local system at different times as well as voice call status at remote systems:

| | |
|---|---|
| Voice-VC: | VC carries voice call |
| Non-voice-VC: | VC does not carry voice call but shares same interface with VC carrying voice |
| Supporting VC: | VC without voice activity detected at local physical interface, but requested by peer to turn on fragmentation supporting remote voice activity. |

Although VC fragmentation session is maintained independently, session establishment and termination may depend on needs of other VCs, locally and/or remotely. For example, VC initially serving as supporting role for remote fragmentation may later be voice-carrying VC, needing to maintain fragmentation that is no longer required by peer. VC role may change with voice calls in the system and network, as well as is its impact on other VCs. In large networks, where many VC connections are supported, change of voice status within one VC may have ripple-effect throughout the network. Hence, present methodology for fragmentation protocol is provided to be highly dynamic.

Optionally, FCP recovery when FCP session is not terminated gracefully is provided, for example, when one end of FCP is left stranded while other end is going through reset. Recovery may be triggered by system boot, path reset, virtual port reset, fragmentation configuration change, missing control packets, etc.

Preferably for Switched Virtual Circuits (SVCs), VC is always declared active to FR VC users, but real SVC connection is established dynamically upon demand. When fragmentation is activated for VCs over physical interface, SVC might not be present to support FCP exchange. Optionally, SVC may not be established immediately due to FCP procedure, because by the time SVC carries traffic, fragmentation may no longer be required. Preferably, FCP is negotiated after specified delay or when SVC is established according to specified and detected criteria, e.g., as being triggered by more certain traffic need.

Hence, when SVC is established, fragmentation requirement is determined locally and remotely. If physical interface is performing fragmentation, FCP signals peer to participate in fragmentation operation, but if no voice call presents at interface, then fragmentation is not started. SVC may serve as supporting peer if remote peer needs fragmentation at remote interface.

Alternately, when FCP determines that it is time to terminate fragmentation at all VCs, SVC no longer connects for end-to-end FCP exchange, so that one side may remove fragmentation status, while other end maintains fragmentation status. Status imbalance is corrected, or resynchronized, until next SVC connection. Preferably, fragmentation operation and status are updated at beginning of SVC connections.

Figure 4A:
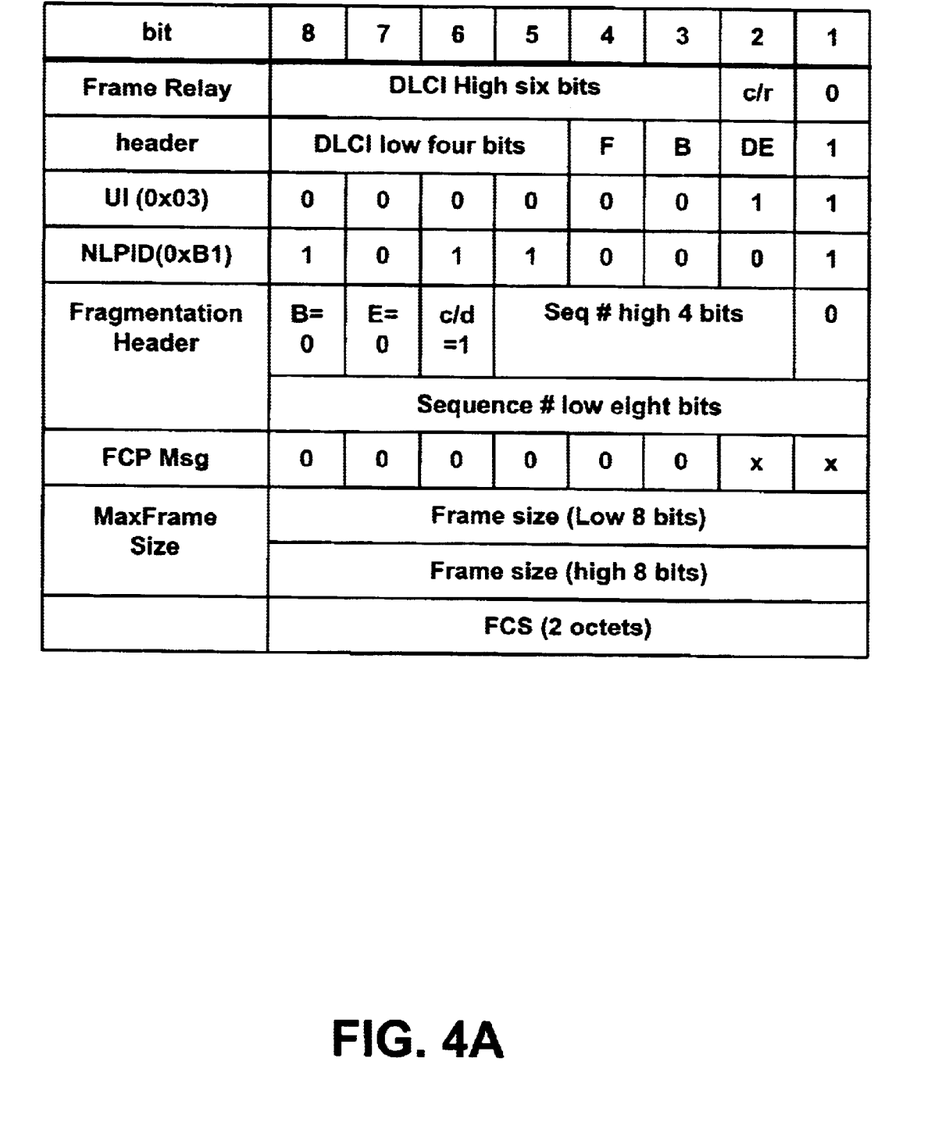
FIG. 4A is a representative data format for end-to-end fragmentation control protocol (FCP) according to one embodiment of the present invention.

FIG. 4A shows representative data message format for end-to-end fragmentation control protocol (FCP). Preferably, as shown in fragmentation header fields, B-bit is set to 0, E-bit is set to 0, C/D bit is set to 1 (i.e., indicating FCP control frame), and sequence number value is optional. Unused header Control/Data (c/d) bit may be used to support FCP control messages. Control (c/d) bit in fragment header (i.e., 5th octet) distinguishes control message from fragment payload; c/d bit which is normally set to 0 for fragmented data transfer is set to 1 to indicate Frame Relay Forum (FRF) control frame. Note that C=1 bit is specifically designed for purpose of control selection. Hence, fragmentation is enabled selectively, with or without FCP interoperating with each other. Additionally, sequential number may be set to detect frame loss and/or validate protocol exchange.

Figure 4B:
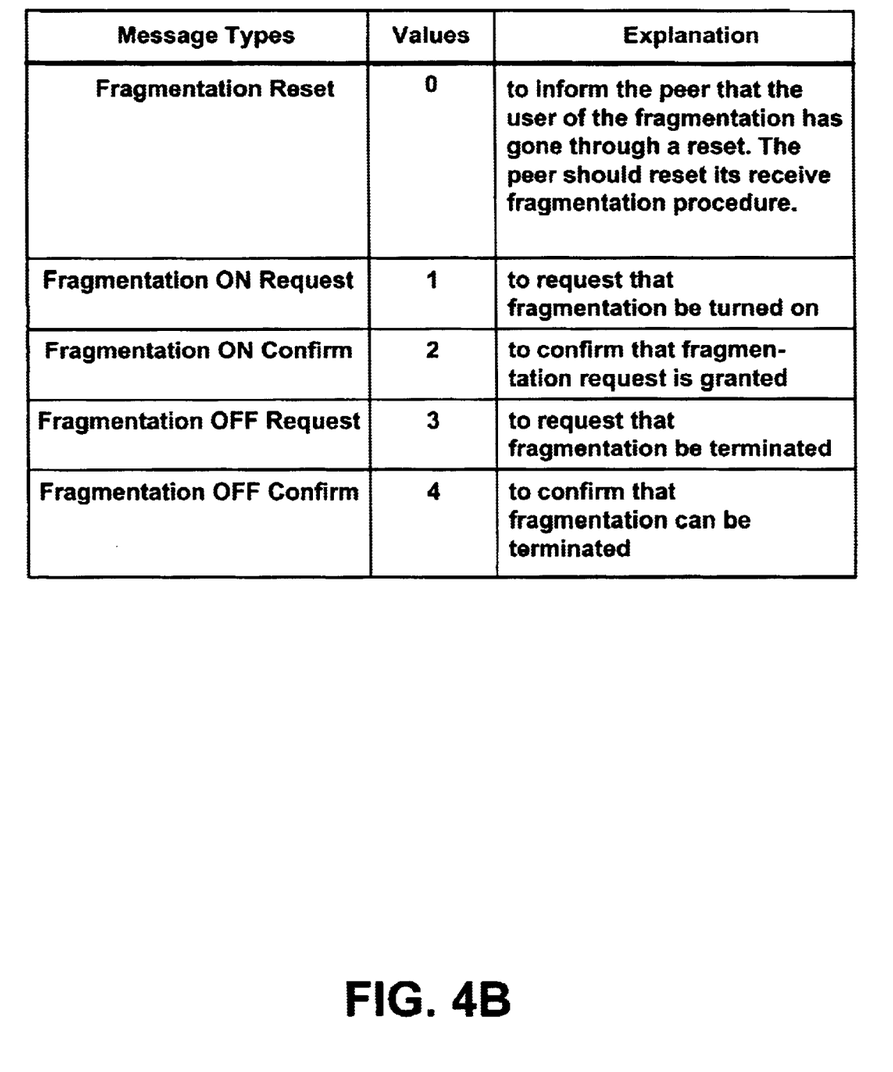
FIG. 4B are representative FCP messages according to one embodiment of the present invention.
Figure 5A:
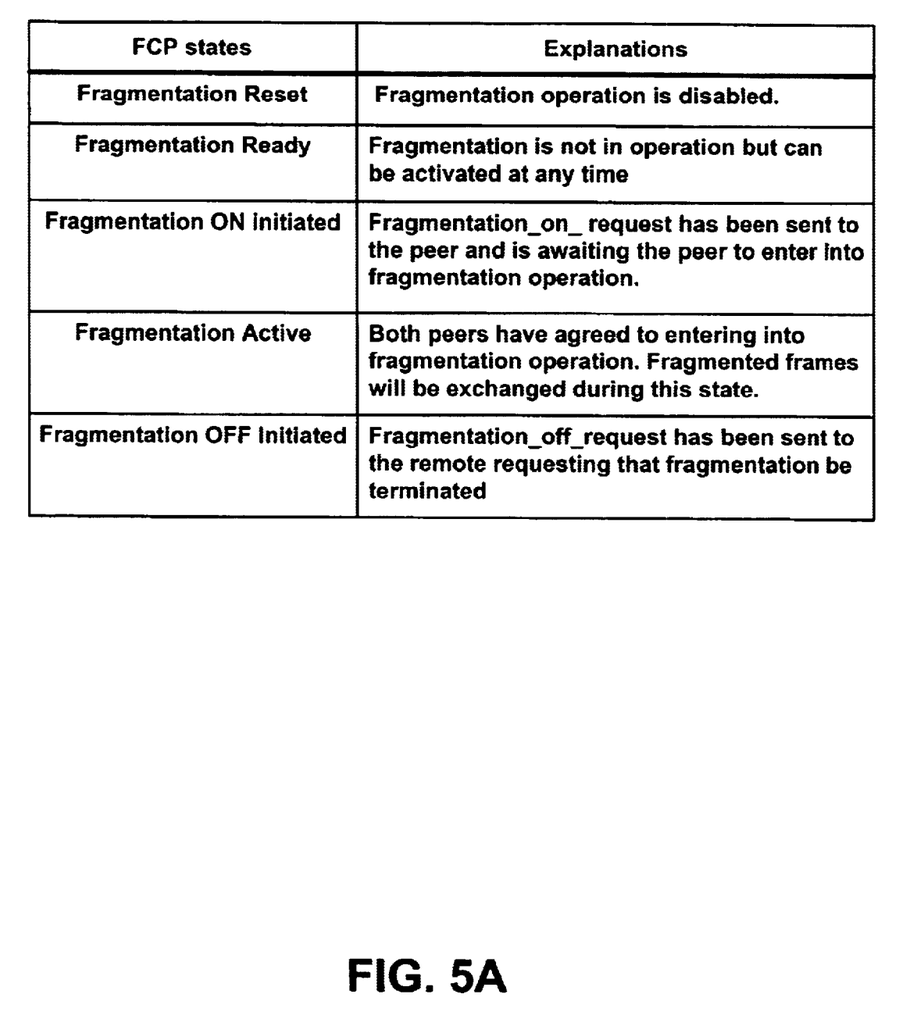
FIG. 5A is a representative table of FCP states according to one embodiment of the present invention.

FIG. 4B shows representative FCP messages (i.e., Fragmentation Reset, Fragmentation ON Request, Fragmentation ON Confirm, Fragmentation OFF Request, and Fragmentation OFF Confirm). FIG. 5A shows representative FCP states (i.e., Fragmentation Disable, Fragmentation Ready, Fragmentation ON Initiated, Fragmentation Active, and Fragmentation OFF Initiated.)

Fragmentation Reset message informs peer that FCP user has reset, due to disable/enable or configuration change (e.g., maxMTU), and now in Fragmentation Ready state. FCP negotiation is required if fragmentation is to be carried out or continued. Message recipient resets its received fragmentation If fragmentation is required, upon receipt of fragmentation_reset message, peer sends Fragmentation On Request message to initiate FCP negotiation process, informing end-to-end FCP that system or VC change of state occurs. (Note in FR context, PVC may be unchanged, while virtual port at other end handles events: VP UP/DOWN, DISABLE/ENABLE, DELETE, and fragment packet size change.)

Fragmentation_on_request message is sent by FCP process to request peer to turn on fragmentation, as initiator is ready to engage in fragmentation operation. Maximum frame size is included in Fragmentation_on_request message, indicating to peer desired fragmented frame size in initiator-to-peer direction. Smaller fragment packet size may be used for peers as MaxFragmentPacketSize value.

Fragmentation_on_confirm message is sent by FCP process in response to the Fragmentation_on_request message from the peer that its request for fragmentation operation has been granted. Receipt of Fragmentation_on_confirm message at side of fragmentation initiator serves as acknowledgment that peer has entered fragmentation operation. Initiator may turn on its fragmentation. Maximum Frame Size parameter may be exchanged in Fragmentation_on_ confirm message. Smaller of two sizes may be used for fragmentation.

Transmission or receipt of Fragmentation_off_request message serves to signal peer that fragmentation operation can now be terminated. FCP session is terminated by mutual consent. MaxFrameSize parameter is optional and informational.

Transmission or receipt of Fragmentation_off_confirm message signals that FCP session is terminated by communicating peers. Unsolicited fragmentation_off_confirm message is sent to deny request for FCP session, because single peer cannot carry on fragmentation operation. MaxFrameSize parameter is optional and informational.

As summarized in FIG. 5A, Fragmentation Disable state indicates that fragmentation operation is disabled. Fragmentation Ready state indicates that fragmentation is not in operation, but can be activated at any time. Fragmentation ON initiated state indicates that Fragmentation_on_

Request has been sent to peer and awaiting peer to enter fragmentation operation. Fragmentation active state indicates peers agree to enter fragmentation operation, and fragmented frames are exchanged during state. Fragmentation off initiated state indicates Fragmentation_off_request sent to remote requesting that fragmentation be terminated.

Note that FCP may use the C(ontrol) bit of fragmentation header to identify preferred FCP format. Such FCP message (i.e., with control bit set to 1) may be discarded by network systems not equipped with preferred FCP format. But to support preferred FCP format in particular system, FCP messages are accordingly understood and exchanged to identify such FCP capability.

In end-to-end fragmentation, as described herein, FCP protocol exchange may not complete successfully, and FCP session may be stranded at one end of FR network. Since fragmentation operates on transmit and reassembly sequences, reset is used to synchronize peer operations. When SVC occurs, either initially after system boot or on other condition, Fragmentation_Reset message is sent to peer to indicate FCP reset. Upon receipt of fragmenting-reset message, peers can re-establish fragmentation operation, if needed, or simply update status for next FCP session.

To initiate fragmentation operation, initiator sends Fragmentation_on_request message to peer. Upon transmit or receipt of Fragmentation_on_confirm message, peers can enter fragmentation operation. Without Fragmentation_on_confirm message, fragmentation does not operate over logical connection (i.e., VC or UNI interface). Fragmentation is then based on static configuration.

When Fragmentation_on_request message is received, if fragmentation can be activated, Fragmentation_on_confirm message is sent to acknowledge to initiator that fragmentation is supported, and request for fragmentation is accepted. Fragmentation procedure is thus activated. If fragmentation is not activated, fragmentation_off_confirm message is sent instead.

On receipt of Fragmentation_on_request message, if FCP is supported but fragmentation operation is to be rejected, Fragmentation_off_confirm message is sent to deny fragmentation request. If FCP is not supported, absence of fragmentation acknowledgment message is treated by initiator that FCP is unsupported by peer. And there is no mechanism to activate or terminate fragmentation. Fragmentation operation is then based on static configuration.

When either peer wishes to terminate fragmentation operation, Fragmentation_off_request message is sent to peer. Receipt or transmission of Fragmentation_off_confirm message indicates peers successfully terminated fragmentation operation. Fragmentation operation is not terminated if fragmentation_off_confirm message is not received.

Fragment size may be configured manually, as specified by user, or automatically, as assigned by FCP system according to default fragment size. Regardless of how fragment size is selected, fragment size is used for negotiation with peer. When "default" fragment size is selected, system derives fragment size indirectly from committed information rate (CIR) configured for particular VC. Note that FR oversubscription is possible, and combined CIR of all VCs may exceed network capacity.

For example, 64 Kbps interface subscribes three 32 Kbps CIR. Fragment size based on CIR may exceed minimum latency requirement when all voice calls transmit and receive voice payload simultaneously. Trade-off arises as more voice calls are supportable at expense of traffic delays. System may displays VC fragment size report, and user may redefine fragment size as desired. Fragment size selection may be used for static fragmentation and included FCP negotiation, as appropriate.

FCP control procedure applies generally to logical connection between logical entities in network. In case of end-to-end fragmentation, logical entities are two communicating VC peers. For each VC connection, independent FCP is maintained therefore. In case of UNI/NNI fragmentation, logical entities are CPE-to-FR switch peer or switch-to-switch peer. There is single logical entity at physical interface level, which governs fragmentation for frames across interface indiscriminately (i.e., for each UNI interface, single FCP session operates across interface.)

Figure 5B:
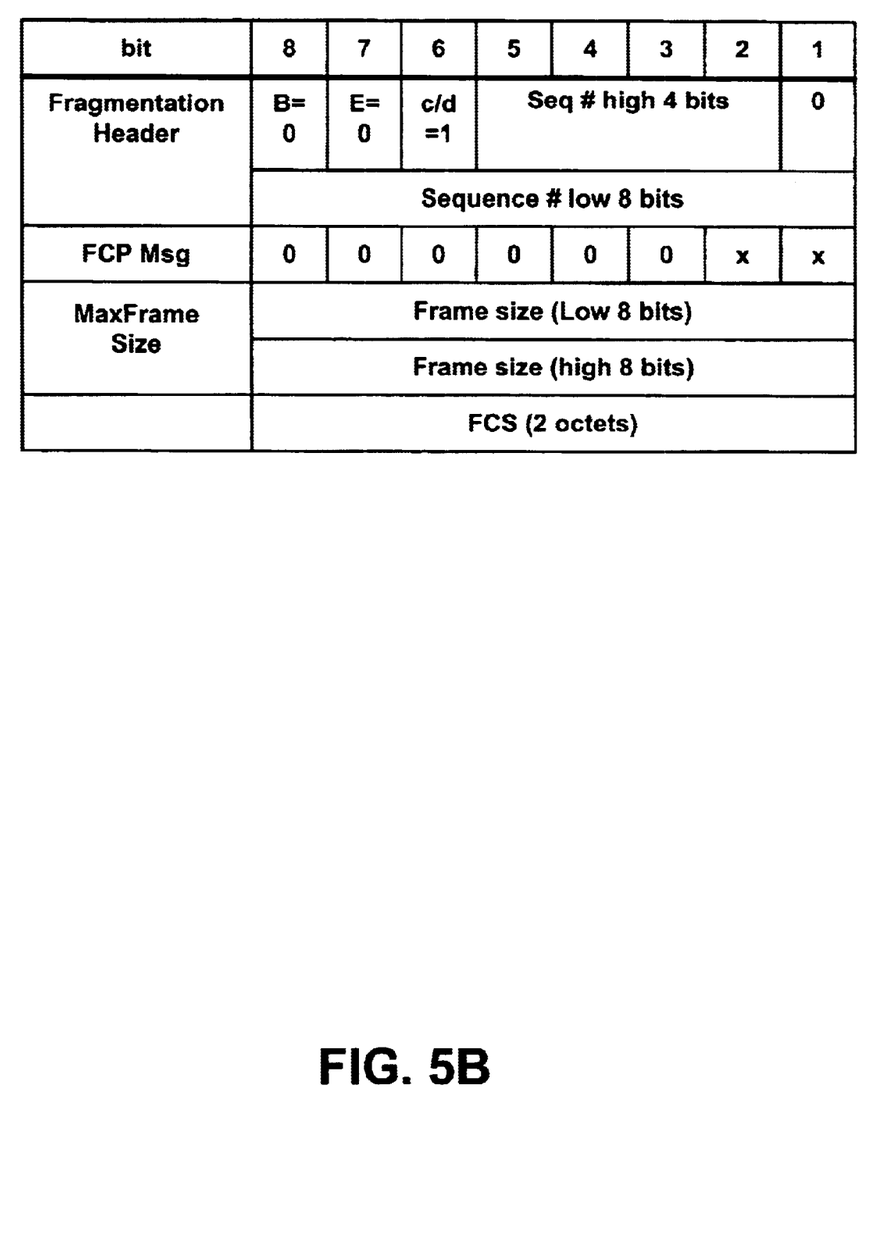
FIG. 5B is a representative UNI and NNI FCP frame format according to one embodiment of the present invention.

According to preferred frame format, UNI/NNI and end-to-end fragmentation header format may differ from end-to-end fragmentation. For UNI/NNI fragmentation, fragmentation header is placed at beginning of frame, whereas in end-to-end fragmentation, fragmentation header is placed right after specified header (e.g., Q.922) for delivery to different VCs. FIG. 5B shows representative UNI and NNI FCP frame format.

VC fragmentation disable or enable may be user-selectable using user interface allowing user to configure packet size for fragmentation. During FCP session establishment, Fragment size is exchanged between communicating peers. Smaller fragment size is used for fragmentation purpose because packet size usually reflects latency requirement. Configured fragment packet size may be used in FCP negotiations.

Following is preferred syntax for fragment packet size:
SETD!<port>-FR FragPktSize=<FRvcid><Fragment size (32-999)>
SHOWD !<port>-FR FragPktSize So-called MTU parameter may also be used to specify fragmentation size for specific FRvcid. (default is no fragmentation.)
SETD!<pathid>-FR FragPktSize=<FRvcid><32-999 None>
<Frvcid> VCID represents virtual circuit uniquely identifies virtual circuit physical interface.
<FragPktSize>

Valid range for fragmentation is 32 bytes to 999 bytes; warning message is reported when value falls outside valid range. Optionally, entry "None" temporarily disables fragmentation. Example follows, where 64-byte fragment size is configured on veid 25.
SETD !<port>-FR FragPktSize=25 64

Various operational modes, e.g., statically-configured fragmentation and/or no fragmentation, may be supported individually or concurrently in same user interface, which is configured for each virtual circuit.

Following are preferred syntax for fragment type and user interface:
SETDefault !<portlist>FragType=<vcid><FragControlProtocol |Static |No >
SHOWD !<port>-FR FragType
<Fragmentation Control Options>
FCP—Fragmentation Control Protocol
Static—Static Configured for fragmentation
None—No Fragmentation, virtual circuit does not participate in fragmentation.

Example usage of fragment type follows:
SETD !<port>-FR FragType=90 FCP

User interface configuration may used as basis for fragmentation operation. When default size is selected, fragmentation software selects fragmentation size per CIR of VC configured for operation. Fragment size chosen is reported under on-line fragmentation status; accordingly, see following syntax and sample report:

SHow [!<port>]-FR FragmentPktSize

| FR Fragmentation Configuration | | | | |
|---|---|---|---|---|
| Port | VCID | Cntl | Conf | FragSize |
| 5 | 98 | Static | Yes | Default |
| 5 | 64 | FCP | Yes | 46 |
| 5 | 21 | No | | |
| 5 | 90 | FCP | Yes | 16 |

In addition to fragmentation configuration, current status of fragmentation control or static configuration,) as well as negotiated fragment size is displayed. Fragment size used may be smaller than configured fragment size, but not larger than configured. For VCs that are not configured for fragmentation, default fragmentation control, i.e., FCP configuration, and default size derived from CIR of VC is used and reported, per following example:

SHow [!<port>]-FR FragmentPktSize

| FR Online Fragmentation Status | | | | | | |
|---|---|---|---|---|---|---|
| Port | VCID | Cntl | Conf | FragSize | Active | Active Size |
| 5 | 21 | FCP | Yes | 32 | Yes | 30 |
| 5 | 90 | Static | Yes | 64 | No | 0 |

Following ng is syntax API for interface to VCM 48 or VFE 42:

fr_vcall(int path, uchar call_status)
path: refers to physical path of voice call (or voice traffic)
call_status: provides status of call in terms of CALL_UP and CALL_DOWN API is single call to FR FCP, and notifies FCP that voice call is active or inactive on specific physical path. Change from zero voice call to first voice call (i.e., voice call count=1) triggers VCs sharing same interface to initiate FCP fragmentation negotiation with peers, provided fragmentation is not disabled. And when last voice call is terminated (i.e., voice call count changes from 1 to 0,) communicating VC FCP peers are caused to request termination of fragmentation with remote peers.

Dynamic establishment and/or termination of FCP depends on voice call status. When voice calls are terminated locally, VCM 48 has responsibility to inform FCP, via API, of voice call status on specific physical interface. On being informed of first voice call, FCP initiates fragmentation negotiation with each remote peer, if fragmentation is not already in operation. When VCM 48 informs FCP of last voice call termination, FCP attempts to request VC remote peers to terminate fragmentation. Request succeeds if fragmentation is not needed at remote ends.

For transient router, VFE 42 is responsible to inform FCP, via API, of presence and absence of voice traffic. Since it may be difficult for VFE 42 to detect progress of voice calls, API is used to turn on and off fragmentation. Transition from 0 to 1 causes VCs to initiate FCP negotiation for fragmentation. Transition from 1 to 0 will causes VCs to trigger FCP termination procedure.

Regarding VoIP IP address to FR physical port conversion, VCM 48 does not know on which physical interface that VoIP voice payload will travel. Conversion routine is used to translate IP address to specific physical port address. FR FCP may not handle IP address translation.

Optionally, various testing of present system and methodology to verify overall dynamics of fragmentation in meshed FR Voice, as originated by one end and terminated at other end. For example, VCM 48 or VFE 42 provision to API to FCP for dynamic fragmentation control may be tested.

For transient router testing, VFE 42 provides stimulus to FCP for fragmentation management. Test scheme may display when certain VCs at transient router are participating in fragmentation operation. Additionally, simulation test scheme may simulate voice call activity, e.g., value 1 representing voice call to interface, and value 0 representing voice call removal from interface. Total voice call count transition from 0 to 1 (i.e., no voice to first voice call,) or from 1 to 0 (i.e., from last voice call to no voice call) causes FCP to initiate fragmentation establishment or termination. Sample syntax of simulation command SU follows:

FR SU!<Port>Voice Call <1/0 > Total voice call registered on interface is reported; following is sample simulation trace:
SUFR TraceLevel 10000000
FRTRACE_FCP_DUMP 0x10000000

FR SU TraceLevel command provides display of FCP protocol message, exchange and protocol states of each FCP session. FCP fragmentation ON/OFF status is reported:
SU FR TraceLevel 8000000

FR SU Trace Level displays fragment raw packets and complete reassembled packet.
Other SU FR TraceLevel C00000
SU FR TL command allows user to see raw data packets in both directions. sufr <port> TraceLevel C00000 turn on both the tx and rx data)

Further, to observe fragmentation operation, FR SU trace with FCP protocol decode is displayed for monitoring FCP operation. In addition, SHow -FR FPS displays configured and negotiated fragmentation session status and negotiated MTU used.
SU FR TL 8000000

Above syntax serves to trace Fragmentation operation and FCP messages and states.

Foregoing described embodiments of the invention are provided as illustrations and descriptions. They are not intended to limit the invention to precise form described. In particular, Applicant contemplates that functional implementation of invention described herein may be implemented equivalently in hardware, software, firmware, and/or other available functional components or building blocks. Other variations and embodiments are possible in light of above teachings, and it is thus intended that the scope of invention not be limited by this Detailed Description, but rather by Claims following.

What is claimed is:

1. A method for fragment control of Frame Relay (FR) communications comprising:
   determining a plurality of peer units in one or more virtual circuits for frame relay-based signaling through one or more interfaces;
   negotiating dynamically a fragmentation operation between two of said plurality of peer units; and
   selectively providing fragmentation to one or more of said virtual circuits based upon said negotiating.
2. The method of claim 1 wherein:
   the selectively provided fragments comprises real-time traffic of Voice-over-Internet-Protocol (VOIP) or Voice-over-Frame-Relay (VoFR) data.

3. The method of claim 1 further comprising dynamically negotiating a configuration parameter and a termination operation between a plurality of said peer units.

4. The method of claim 1 wherein:
the fragmentation is provided in a User-to-Network Interface (UNI) or Network to Network Interface (NNI) fragmentation configuration between a first peer physical driver at a Customer Premises Equipment (CPE) and a second peer physical driver at a switch of a Frame Relay network.

5. The method of claim 1 wherein:
the fragmentation is deployable on demand by one or more peers.

6. The method of claim 1 further comprising the step of:
interoperating one or more of the determined virtual circuits with one or more networks that do not support fragmentation.

7. A Frame Relay (FR) network comprising:
a frame relay (FR) interconnect; and
a fragmentation control protocol (FCP) for dynamically negotiating and providing a fragmentation service to one or more peers in one or more virtual or physical circuits accessible through said frame relay (FR) interconnect.

8. The network of claim 7 further comprising:
an FR access device for supporting real-time voice traffic over the FR interconnect.

9. The network of claim 7 wherein:
the FCP enables communicating peers dynamically to negotiate a fragmentation operation, a configuration parameter, or a termination operation.

10. The network of claim 7 wherein: the FCP is applicable to a plurality of peers for a User to Network Interface (UNI) fragmentation, a Network to Network Interface (NNI) fragmentation, a Point to Point Protocol (PPP) fragmentation, or an end-to-end fragmentation.

11. The network of claim 7 wherein:
the FCP deploys fragmentation on demand.

12. The network of claim 7 wherein:
the FCP enables interoperation between one or more of the virtual circuits with one or more networks that do not support fragmentation.

13. A Frame Relay (FR) protocol apparatus comprising:
a frame relay core; and
a fragmentation control protocol (FCP) means for dynamically negotiating generation and generating one or more fragments for one or more peers in one or more virtual circuits coupled to said frame relay core.

14. The apparatus of claim 13 further comprising:
an application programming interface (API) for programming the FCP means.

15. The apparatus of claim 13 further comprising:
an expedited transmit or receive path for sending or receiving one or more fragments.

16. The apparatus of claim 13 further comprising:
compression or decompression means for compressing or decompressing respectively one or more fragments for transmission or reception.

17. The apparatus of claim 13 further comprising:
a policy module for prioritizing transmission of one or more fragments.

18. The apparatus of claim 13 wherein:
the FCP means is applicable to a plurality of peers for a User to Network Interface (UNI) fragmentation, a Network to Network Interface (NNI) fragmentation, a Point to Point Protocol (PPP), fragmentation, or an end-to-end fragmentation.

* * * * *